United States Patent Office

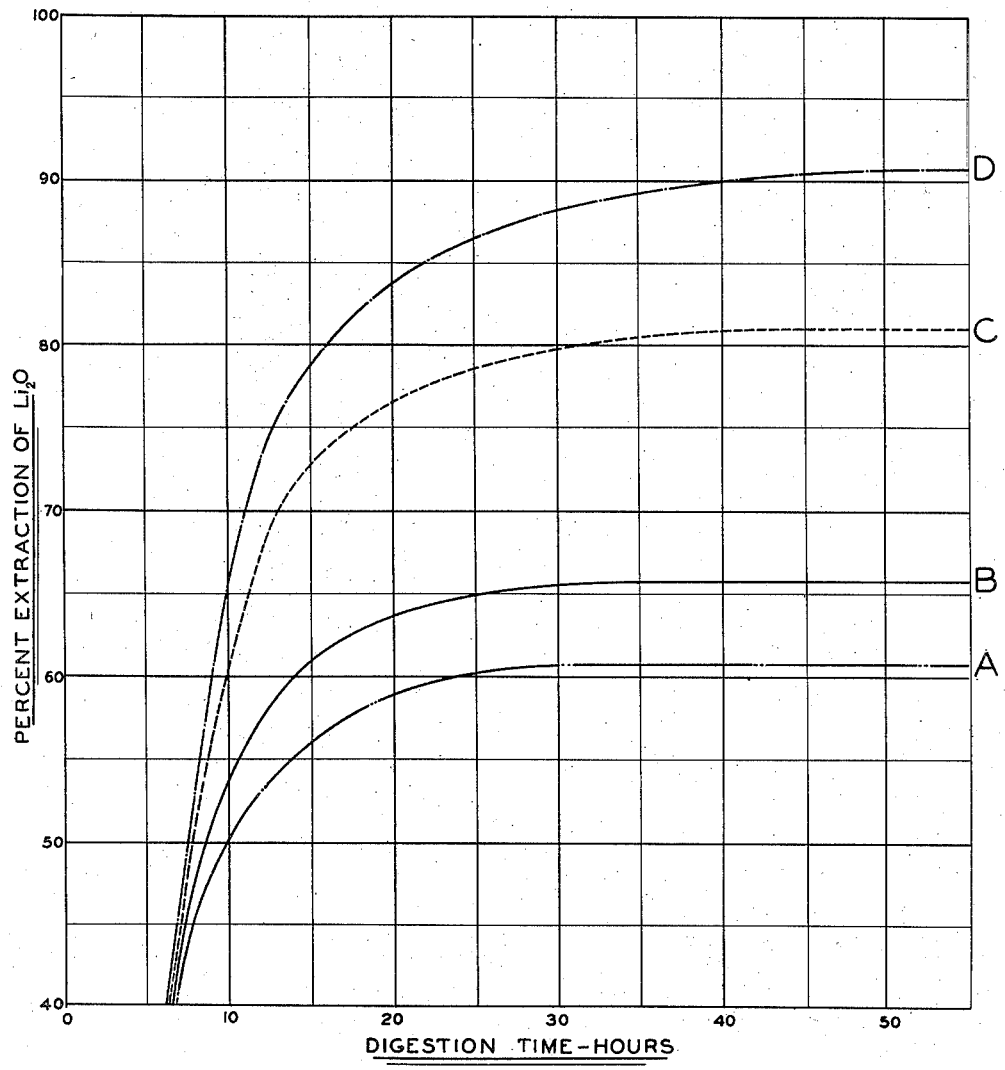

2,803,518
Patented Aug. 20, 1957

2,803,518

METHOD OF RECOVERING LITHIUM VALUES

Lawrence J. Reader, Malvern, Pa., assignor to Foote Mineral Company, Philadelphia, Pa., a corporation of Pennsylvania Application May 10, 1955, Serial No. 507,394

12 Claims. (Cl. 23—32)

The present invention relates to a novel method of obtaining lithium values from spodumene; and, more particularly, the invention relates to a novel method for obtaining from spodumene the lithium values directly as lithium chloride which method is relatively simple and inexpensive.

In most of the suggested processes for recovering lithium values from spodumene, the spodumene is first calcined with lime to convert the lithium to a more readily available form. In one procedure, the resulting calcined product is digested with water. The lithium, as lithium hydroxide, is then recovered from the resulting liquor. In another procedure, the resulting calcined product is reacted with hydrochloric acid at superatmospheric steam pressures and temperatures, and the lithium values obtained directly as lithium chloride. By this procedure the lithium chloride product is highly contaminated with silicic acid. This requires insolubilization of the silica by a dehydration procedure in order to separate it from the lithium chloride. In addition, by this procedure a large amount of acid is required to neutralize the lime. In still another process, calcium chloride is included with the lime and spodumene, and the calcination is such as to result in volatilization of lithium chloride which is separately recovered.

Still other processes have been suggested for the recovery of lithium values from spodumene. In one case the spodumene, after calcination to convert it from the alpha to the beta form, is roasted with strong sulphuric acid at a temperature of about 250° C. This process involves, it is stated, the replacement of the lithium ions in the beta-spodumene with hydrogen ions. It is further stated that this ion exchange reaction does not take place at temperatures below about 175° C.

All the foregoing illustrates a long held belief concerning spodumene, as distinguished from other minerals and ores containing lithium; namely, that in order to leach out the lithium values from the betaspodumene with acid it is necessary either first to convert the lithium to a more available form by calcination with lime or to roast the betaspodumene with strong acid at very high temperatures.

Because of the multiplicity of steps, high acid requirements, and/or exceedingly high temperatures, the production of lithium chloride from spodumene by the prior suggested processes has been retarded. Due to the great desirability of being able to extract the lithium values directly from spodumene as for example, lithium chloride, by reaction with, for example hydrochloric acid, attempts have been made to do this and only failure reported. There are statements in the literature indicating that lithium values cannot be extracted from spodumene directly by means of hydrochloric acid.

It is the principal object of the present invention to provide a process whereby lithium values may be recovered directly from spodumene as lithium chloride.

Still another object of the present invention is to provide a novel process for extracting, from spodumene, the lithium values directly as lithium chloride which process is relatively simple and economical.

A further object of the present invention is to provide a novel process for extracting lithium values from spodumene directly as lithium chloride whereby high yields of lithium may be obtained.

Other objects will become apparent from a consideration of the following specification and claims.

The process of the present invention comprises digesting betaspodumene with excess aqueous hydrochloric acid at a temperature above about 90° C. and below the boiling point of the hydrochloric acid solution for a period of at least about 10 hours, whereby lithium values in the betaspodumene are converted to lithium chloride. The lithium chloride can then be simply separated from the spent spodumene as by washing with water.

In the accompanying drawing, Figure 1 sets forth curves illustrating the relation between the degree of extraction of lithium chloride (expressed as lithia) and the reaction time, each curve representing a different proportion of hydrochloric acid.

The method of the present invention is based upon the discovery that a novel combination of conditions and factors, each of which is inter-dependent upon the other, results in the extraction of unexpectedly high yields of lithium, as lithium chloride, directly from betaspodumene. By the method of the present invention as high as 90% or more of the lithium in the spodumene can be recovered directly as lithium chloride. The process is simple, requiring a minimum of steps. The principal step is merely the reaction between lithium in the betaspodumene and hydrochloric acid, and, unlike the previously suggested sulphuric acid extraction process, excessively high temperatures are not required. In addition, what impurities are associated with the lithium chloride product are present in very small amounts and are easily separated from the lithium chloride. Furthermore, the amount of acid actually utilized during the process is just about that required for combination with the lithium, and excess unutilized acid is readily recovered for reuse in the process.

The lithium-bearing material treated in accordance with the present invention is, as stated, betaspodumene. Spodumene as the as-mined mineral, is in the alpha form. As is well known, calcinations of alphaspodumene at temperatures in the neighborhood of 950–1100° C. converts it to betaspodumene. The as-mined ore normally contains about 1–2% of lithium (as $Li_2O$), and while the present process is applicable to the treatment of this material, after calcination to convert the spodumene to beta form, it is preferred that the mineral be first concentrated to separate it from the gangue present in the raw ore. Conventional concentration procedures generally raise the lithium content (as $Li_2O$) to about 5–7%. Calcination may take place before or after concentration. Herein, the term "betaspodumene," unless otherwise qualified, will refer to both the raw as-mined ore as well as to the concentrated material, which have been subjected to calcination and in which, therefore, the spodumene exists in beta form.

The betaspodumene treated in accordance with the method of the present invention will be in relatively finely divided state and preferably it will pass through a 10 mesh screen. Calcination causes decrepitation of the mineral reducing it to a size suitable for treatment in the present process. If further reduction in size is required, conventional grinding procedures may be employed.

In accordance with the method of the present invention, the betaspodumene is intimately mixed with excess aqueous hydrochloric acid. It has been found that, in order to obtain significant yields of lithium as lithium chloride from the betaspodumene, the amount of hydrochloric acid (HCl) employed should be in excess of that theoretically required for combination with the lithium present in the betaspodumene. Generally, the greater the excess the higher the recovery of lithium, and for substantial recoveries it has been found that at least a 25%, by weight, excess should be employed. As the amount of hydrochloric acid in excess of this figure increases, the recovery of lithium chloride also increases until, with amounts of hydrochloric acid in the neighborhood of about 100% excess, recoveries of 90% or more of the lithium can be obtained. Amounts of hydrochloric acid as high as about 150–200% excess may be employed, if desired. However, such practice becomes less economical and no significant advantage is obtained commensurate with the added cost. In most cases, the amount of hydrochloric acid employed will be between about 45% and about 100%, by weight, in excess of that theoretically required.

As stated, aqueous hydrochloric acid will be employed. The maximum concentration of HCl in water is about 35–37%, by weight. However, at the temperatures employed in accordance with the present method, concentrations above about 22% HCl fume badly representing wastage and giving rise to operating problems. Accordingly, in the initial aqueous hydrochloric acid solution employed in accordance with the present method, the concentration of HCl will normally be below about 22%. The lower limit of concentration is not critical, and the concentration of HCl in the aqueous hydrochloric acid solution employed may go as low as about 5–10%. However, the more dilute the aqueous hydrochloric acid employed the greater the volume of liquid which must be heated during digestion, and for this reason it is preferred that the concentration of HCl in the initial solution be at least about 15%. A particularly satisfactory aqueous hydrochloric acid solution for use in the present process is one containing in the neighborhood of 19–21% HCl.

The mixing of the aqueous hydrochloric acid with the betaspodumene results in a wet mass. In accordance with the method of the present invention, this wet mixture is heated at a temperature above about 90° C. and below the boiling point of the aqueous hydrochloric acid for at least about 10 hours. The aqueous hydrochloric acid solution has a boiling point in the neighborhood of 103–109° C., depending, of course, upon the exact concentration of acid employed. A particularly suitable temperature range is between about 94 and 98° C.

Digestion of the described mixture under the above-discussed conditions for a period of at least about 10 hours results in the conversion of at least the major portion of the lithium in the betaspodumene to soluble lithium chloride. As the digestion time is increased the degree of conversion also increases up to a point, in the neighborhood of 24–40 hours of digestion, beyond which the increase in conversion is generally not significant enough to warrant longer digestion periods. Although in some cases it may well be worthwhile to employ longer digestion times, even as long as 50–60 hours. Preferably, the material is digested for at least about 15 hours.

The foregoing is illustrated in the drawing in which are set forth curves showing the percentage extraction of lithium, as Li₂O, at various digestion times. The curves differ as to the amount of hydrochloric acid employed, curve A illustrating the use of 25% excess hydrochloric acid, curve B the use of 50% exess hydrochloric acid, curve C the use of 75% excess hydrochloric acid, and curve D the use of 100% excess hydrochloric acid. In all cases the temperature of digestion was substantially the same, in the range 95–98° C. Curves A and D deal with a betaspodumene concentrate containing 5.79% Li₂O and curves B and C with a betaspodumene concentrate containing 6.08% Li₂O. The curves show that, in the first place, at digestion times below about 10 hours, the extraction of lithium falls off sharply to insignificance. The curves also illustrate the influence of the proportion of hydrochloric acid employed to lithium in the betaspodumene, being treated. It will be noted that in order to obtain high recoveries a substantial excess of hydrochloric acid must be employed.

After the mixture has been digested for the desired period, the lithium chloride now in the mass may be easily separated from the spent spodumene and recovered. The most advantageous form of recovery is by washing the product with an aqueous medium, such as water itself. Before separation of the lithium chloride it may be advantageous to remove excess unreacted hydrochloric acid from the mass for recovery and re-use as by heating the mass above the boiling point of the aqueous hydrochloric acid employed. The recovery of the lithium chloride from the digested product will present no problem since the lithium chloride is highly soluble and readily leached from the mass. Water may be mixed with the mass following which the resulting lithium chloride-containing solution is separated from the solids as by filtration, settling, centrifuging, or the like.

The resulting aqueous solution of lithium chloride can be worked up in any desired way, well known to those familiar with the art. To remove impurities, such as iron and manganese which may be present in the solution, milk of lime can be added to the solution following which air is blown therethrough. The resulting iron and manganese oxides which precipitate can then be separated from the remaining solution. If it is desired to recover the lithium in solid form, the solution can be evaporated. On the other hand, the solution can be used as such or worked in any other desired way to recover the lithium values therefrom.

The process of the present invention will be more readily understood from a consideration of the following specific examples which are given for the purpose of illustration only and are not intended to limit the scope of the invention in any way.

*Example I*

Betaspodumene concentrate, containing 6.08% Li₂O, is mixed with a 20% hydrochloric acid solution in an amount providing 50% excess of hydrochloric acid over that theoretically required for reaction with the lithium in the betaspodumene. The moist mass is then digested at 96° C. After periods specified in Table I below, samples of the digested material are removed, heated above 105° C. to remove excess hydrochloric acid, and washed with water to recover the lithium chloride. From this, the percentage of lithium, as Li₂O, extracted from the spodumene at the specified digest time is calculated, and these data are also set forth in Table I below.

TABLE I

| Digest time, hours: | Percent extraction of Li₂O |
|---|---|
| 7 | 43.7 |
| 16 | 65.4 |
| 18 | 63.6 |
| 20 | 65.8 |
| 22 | 61.3 |
| 24 | 63.2 |
| 26 | 66.0 |
| 28 | 63.7 |
| 31 | 66.4 |
| 36 | 67.0 |
| 48 | 65.5 |

*Example II*

Betaspodumene concentrate containing 6.08% Li₂O is mixed with a 20% hydrochloric acid solution in an amount to provide 75% excess of HCl over that theoretically required for combination with the lithium. The mass is then digsted at 96° C. After periods specified below in Table II, samples of the digested material are removed, heated above 105° C. to remove excess unreacted HCl, and washed with water to recover the lithium values as lithium chloride. Calculations are made to determine the percent extraction of lithium, as $Li_2O$, from the betaspodumene at the particular digestion time, and these data are also set forth in Table II.

TABLE II

| Digest time, hours: | Percent extraction of $Li_2O$ |
|---|---|
| 7 | 43.7 |
| 16 | 79.4 |
| 18 | 56.9 |
| 20 | 75.3 |
| 22 | 74.8 |
| 24 | 77.4 |
| 26 | 78.0 |
| 28 | 75.7 |
| 31 | 77.8 |
| 36 | 74.4 |
| 48 | 81.0 |

*Example III*

Betaspodumene concentrate containing 5.79% $Li_2O$ is mixed with a 20% hydrochloric acid solution in an amount to provide 100% excess over that theoretically required for reaction with the lithium in the spodumene. The wet mass is digested at 95° C. for 24 hours. The mass is then heated above 105° C. to drive off excess unreacted hydrochloric acid. The resulting product is then washed with water, and the solution of lithium chloride recovered. The lithium chloride obtained represents 87.6% of the lithium in the betaspodumene.

*Example IV*

Using the materials and procedure of Example III but digesting for 40 hours results in the recovery of 91.5% of the lithium.

*Example V*

Using the materials and procedure of Example III but digesting for 66 hours results in the recovery of 94% of the lithium.

*Example VI*

Calcined spodumene ore, containing 1.96% $Li_2O$, is mixed with a 20% hydrochloric acid solution in an amount to provide 45% excess of hydrochloric acid over that theoretically required for reaction with the lithium. The mass is digested at 96–98° C. for 45 hours resulting in a recovery of 77% of the lithium from the spodumene ore.

*Example VII*

Using the calcined spodumene ore of Example VI and a 20% hydrochloric acid solution in an amount to provide 75% excess of hydrochloric acid, and digesting at 96–98° C. for 24 hours results in the recovery of 75% of the lithium from the spodumene ore as lithium chloride.

Considerable modification is possible in the selection of the particular conditions employed as well as in the exact techniques followed without departing from the scope of the present invention.

I claim:

1. The method of recovering lithium values from betaspodumene which comprises the step of digesting betaspodumene with excess aqueous hydrochloric acid at a temperature above about 90° C. and below the boiling point of the aqueous hydrochloric acid for a period of at least about 10 hours whereby at least a substantial portion of the lithium in the betaspodumene is converted to lithium chloride.

2. The method of claim 1 wherein the material is digested for at least about 15 hours.

3. The method of recovering lithium values from betaspodumene which comprises the step of digesting betaspodumene with aqueous hydrochloric acid in an amount of at least about 25% in excess of that theoretically required for reaction with the lithium in the betaspodumene at a temperature above about 90° C. and below the boiling point of the aqueous hydrochloric acid for a period of at least about 10 hours whereby at least a substantial portion of the lithium in the betaspodumene is converted to lithium chloride.

4. The method of claim 3 wherein the material is digested for at least about 15 hours.

5. The method of recovering lithium values from betaspodumene which comprises the step of digesting betaspodumene with aqueous hydrochloric acid in an amount between about 45% and about 100% in excess of that theoretically required for reaction with the lithium in the betaspodumene, at a temperature above about 90° C. and below the boiling point of the aqueous hydrochloric acid for a period of at least about 10 hours.

6. The method of claim 5 wherein the material is digested for at least about 15 hours.

7. The method of recovering lithium values from betaspodumene which comprises the step of digesting betaspodumene with excess aqueous hydrochloric acid having a concentration of HCl of between about 5 and about 22%, at a temperature above about 90° C. and below the boiling point of the aqueous hydrochloric acid for a period of at least about 10 hours whereby at least a substantial portion of the lithium in the betaspodumene is converted to lithium chloride.

8. The method of claim 7 wherein the aqueous hydrochloric acid is in an amount of at least about 25% in excess of that theoretically required for reaction with the lithium in the betaspodumene.

9. The method of claim 8 wherein the aqueous hydrochloric acid is in an amount between about 45% and about 100% in excess of that theoretically required for reaction with the lithium in the betaspodumene.

10. The method of claim 9 wherein the material is digested for between about 15 and about 40 hours.

11. The method of recovering lithium values from betaspodumene which comprises digesting betaspodumene with excess aqueous hydrochloric acid at a temperature above about 90° C. and below the boiling point of the aqueous hydrochloric acid for a period of at least about 10 hours whereby at least a substantial portion of the lithium in the betaspodumene is converted to lithium chloride, and washing the resulting material to recover the lithium chloride therefrom.

12. The method of claim 11 wherein the aqueous hydrochloric acid has a concentration of HCl of between about 15 and about 22%; wherein the aqueous hydrochloric acid is in an amount between about 45% and about 100% in excess of that theoretically required for reaction with the lithium in the betaspodumene; wherein the temperature of digestion is between about 94 and about 98° C., and wherein the material is digested for between about 15 and about 40 hours.

References Cited in the file of this patent

UNITED STATES PATENTS 2,662,809    Kroll _____ Dec. 15, 1953